(12) United States Patent
Chou et al.

(10) Patent No.: US 7,406,185 B2
(45) Date of Patent: Jul. 29, 2008

(54) THERMOELECTRIC SENSOR FOR FINGERPRINT THERMAL IMAGING

(75) Inventors: Bruce C. S. Chou, Hsinchu (TW);
Yuan-Wei Cheng, Hsinchu (TW);
Ching-Fu Tsou, Taichung (TW);
Ming-Lin Tsai, Taipei (TW)

(73) Assignee: Ligh Tuning Technology Inc., Hsinchu (TW)

( * ) Notice: Subject to any disclaimer, the term of this patent is extended or adjusted under 35 U.S.C. 154(b) by 652 days.

(21) Appl. No.: 10/414,214

(22) Filed: Apr. 16, 2003

(65) Prior Publication Data

US 2004/0208345 A1 Oct. 21, 2004

(51) Int. Cl.
*G06K 9/00* (2006.01)
*G05B 19/00* (2006.01)
*F25B 21/02* (2006.01)

(52) U.S. Cl. .................. 382/124; 340/5.52; 340/5.53; 62/3.2; 62/3.3

(58) Field of Classification Search ................. 382/124, 382/126, 127, 313, 314, 315; 340/5.52, 5.53, 340/5.82, 5.83; 62/3.2, 3.3; 73/204.23, 204.24; 257/930

See application file for complete search history.

(56) References Cited

U.S. PATENT DOCUMENTS

| 4,358,677 | A | * | 11/1982 | Ruell et al. .................. 250/216 |
| 4,429,413 | A | * | 1/1984 | Edwards ...................... 382/124 |
| 5,823,966 | A | * | 10/1998 | Buchert ....................... 600/473 |
| 5,940,526 | A | * | 8/1999 | Setlak et al. ................. 382/124 |
| 6,300,554 | B1 | * | 10/2001 | Du et al. ...................... 136/201 |
| 6,335,478 | B1 | * | 1/2002 | Chou et al. .................. 136/201 |
| 6,633,656 | B1 | * | 10/2003 | Picard ......................... 382/124 |
| 2003/0139687 | A1 | * | 7/2003 | Abreu .......................... 600/558 |
| 2004/0059212 | A1 | * | 3/2004 | Abreu .......................... 600/373 |

* cited by examiner

*Primary Examiner*—Brian Q Le
(74) *Attorney, Agent, or Firm*—Rosenberg, Klein & Lee (57) ABSTRACT

The present invention provides a fingerprint sensing mechanism using a two-dimensional thermoelectric sensor array to capture the thermal image related to the ridges and valleys on the finger, wherein its fabricating method is totally compatible with integrated circuits processing. Using the body temperature of a human being as the stimulation source for biometrics, a temperature difference is produced from a ridge of a fingerprint contacting the thermoelectric sensor and the temperature gradient is converted into an electrical signal. A plurality of thermoelectric sensors arranged in a two-dimensional array forms a fingerprint sensor so as to obtain the electrical signal output of the ridge profile of the fingerprint.

8 Claims, 8 Drawing Sheets

THERMOELECTRIC SENSOR FOR FINGERPRINT THERMAL IMAGING

BACKGROUND OF THE INVENTION

1. Field of the Invention

The present invention generally relates to a fingerprint sensing method, and more particularly, relates to a thermal imaging method of fingerprint using thermoelectric sensor and its IC compatible fabrication The present invention is partially related to U.S. Pat. No. 6,300,554 B1 entitled "METHOD OF FABRICATING THERMOELECTRIC SENSOR AND THERMOELECTRIC SENSOR DEVICE" and U.S. Pat. No. 6,335,478 B1 entitled "THERMOPILE INFRARED SENSOR, THERMOPILE INFRARED SENSOR ARRAY, AND METHOD OF MANUFACTURING THE SAME".

2. Description of the Prior Art

Early methods of fingerprinting utilized ink to transfer the fingerprint onto paper for checking directly or optically scanning the fingerprint into a computer to compare with a stored database for personal verification or authentication. The major problem with these methods is that they cannot provide a real-time solution to satisfy the increasing demands of such applications as internet security, electronic transactions, handheld electronic device security, personal ID, etc.

For this reason, some real-time fingerprint sensing methods were introduced in the past including optical-types as disclosed in U.S. Pat. Nos. 4,053,228 and 4,340,300; chip-type fingerprint sensors including pressure induced piezoelectric effect or electrically contacting as described in U.S. Pat. Nos. 4,394,773, 5,503,029, 5,400,662, and 5,844,287; capacitance sensing as in U.S. Pat. No. 6,049,620; and finally temperature sensing as in U.S. Pat. No. 6,061,464.

Because of the size of the optics module, the optical type is not suitable for handheld electronic products, such as notebook computers or cellular phones.

The major advantage of the chip-type fingerprint sensor is its small size so that can potentially be embedded into any electronics system. However, the chip-type fingerprint sensor of the prior art has some drawbacks including high power consumption (electrically contacting and temperature sensing ones), non-IC process compatible (piezoelectric and temperature sensing ones), dry or wet finger interference (capacitance), and ESD damage (capacitance).

For these reasons, the present invention provides a chip-type fingerprint sensor with low power consumption, IC process compatible, minor wet or dry finger interference and ESD damage resistance.

SUMMARY OF THE INVENTION

An object of the invention is to provide a fingerprint sensing mechanism using two-dimensional thermoelectric sensor arrays to capture the thermal image related to the ridges and valleys on the finger, wherein its fabricating method is totally compatible with integrated circuit processes. Using the body temperature of a human being as the stimulation source for biometrics, a temperature difference is produced from a ridge of a fingerprint contacting the thermoelectric sensor and the temperature gradient is converted into an electrical signal.

An embodiment of the present invention provides a thermoelectric sensor structure, wherein said sensor structure comprises a silicon substrate; a field oxide layer or a trench isolation layer on said silicon substrate acting as a thermal-isolation structure; at least a thermocouple serially connected to form a thermopile, wherein a hot-junction region of the thermopile is located at a central portion of the field oxide layer and a cold-junction region is located on a thin oxide layer which is surrounding the field oxide layer; and a heat pipe structure comprising at least an interconnection layer and at least a via hole metal, wherein the heat pipe structure is located between the central portion of the field oxide layer and a passivation layer, which is on the surface of the substrate.

Another embodiment of the present invention provides a fingerprint sensor which comprises a plurality of thermoelectric sensors arranged in a two-dimensional array and integrates its signal processing circuitry on a single chip, which utilizes body temperature as a sensing mechanism for personal verification or authentication. When the finger ridge contacts the sensor, a temperature gradient is generated from the hot-junction region of the thermoelectric sensor to the cold-junction region, wherein the thermoelectric sensor converts the temperature gradient into a voltage signal.

BRIEF DESCRIPTION OF THE DRAWINGS

The foregoing aspects and many of the accompanying advantages of this invention will become more readily appreciated as the same becomes better understood by reference to the following detailed description, when taken in conjunction with the accompanying drawings, wherein.

DESCRIPTION OF PREFERRED EMBODIMENTS

Figure 1:
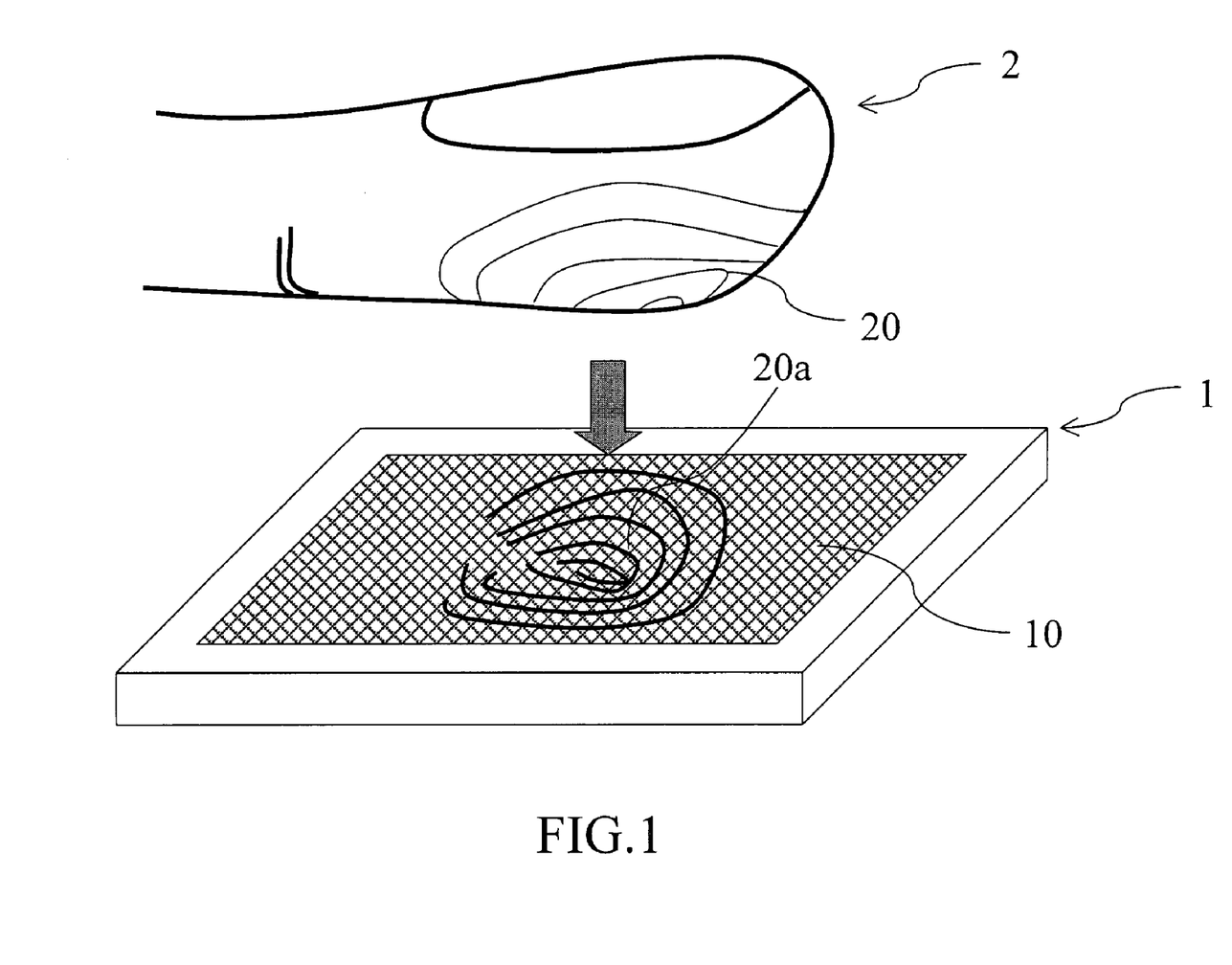
FIG. 1 is a drawing illustrating a thermoelectric sensor array for fingerprint scanning, according to an embodiment of the present invention.

Refer to FIG. 1, which is a schematic representation of a fingerprint sensor 1 based on a thermoelectric sensor array according to an embodiment of the present invention, wherein the sensor chip 1 is used to read the ridge pattern of a fingerprint and comprises a plurality of thermoelectric sensors 10 arranged in a two-dimensional (2-D) array. When the finger contacts the sensor chip 1, the ridge pattern 20 will contact with a portion of sensor devices 10 and have a heat transfer between each other to form a thermal pattern onto the chip 1. Thermoelectric effect will convert this heat to an electrical signal to realize the original fingerprint ridge distribution.

Figure 2:
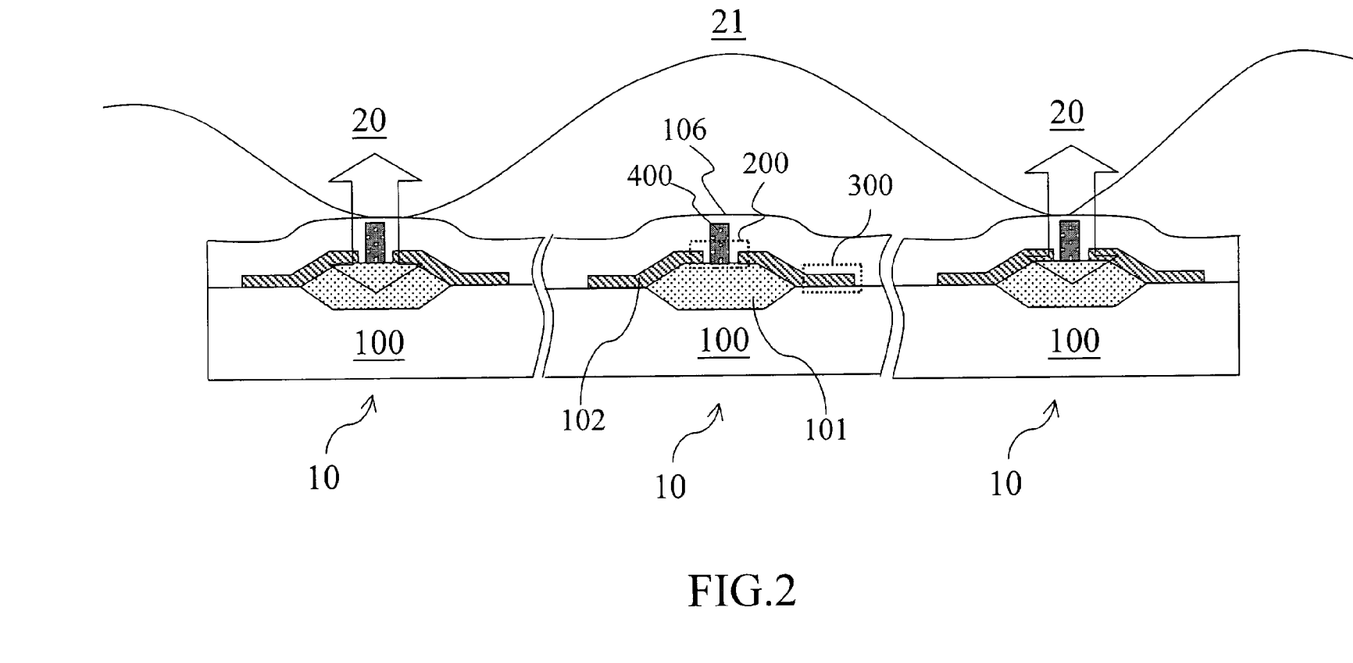
FIG. 2 is a schematic representation of the sensing principle using thermoelectric effect based on temperature gradient according to an embodiment of the present invention.

Referring to FIG. 2, which is a schematic representation of the sensing principle using thermoelectric effect based on temperature gradient according to an embodiment of the present invention. Each of the sensors 10 is fabricated using commercially available IC processing, especially the CMOS process. The basic structure of the sensor 10 comprises a silicon substrate 100; a field oxide layer (LOCOS) 101 used as a heat isolation layer; a thermopile formed by connecting at least a thermocouple 102 in series, wherein the hot-junction region 200 of the thermopile is located at a central portion of the field oxide layer 101 and a cold-junction region 300 of the thermopile is located on a thin oxide layer (not shown) surrounding the field oxide layer 101; and a heat pipe structure 400 comprising at least an interconnect layer and at least a via hole metal, wherein the heat pipe 400 structure is located between the central portion of the field oxide layer 101 and a passivation layer 106.

A fingerprint comprises ridge 20 and valley 21. When the ridge 20 of fingerprint makes contact with the sensor 10, heat (indicated by the arrow symbol) transferred between the ridge 20 of fingerprint and the sensor via the solid heat conduction mechanism. Wherein, most of the heat energy is transferred through the path of the heat pipe and then from the hot-junction to the cold-junction of the thermopile so as to produce a temperature difference $\Delta T$ between the hot-junction region 200 and the cold-junction region 300. The thermoelectric sensor 10 utilizes the temperature difference $\Delta T$ to induce a voltage signal to discriminate if the sensor 10 is in contact with a ridge or not. The voltage generated from the sensor 10 can be shown as the following formula (1):

$$V=N\alpha\Delta T \quad (1)$$

Wherein N is the number of thermocouples in series and $\alpha$ is the Seeback coefficient (V/° C.) of a single thermocouple.

Figure 3:
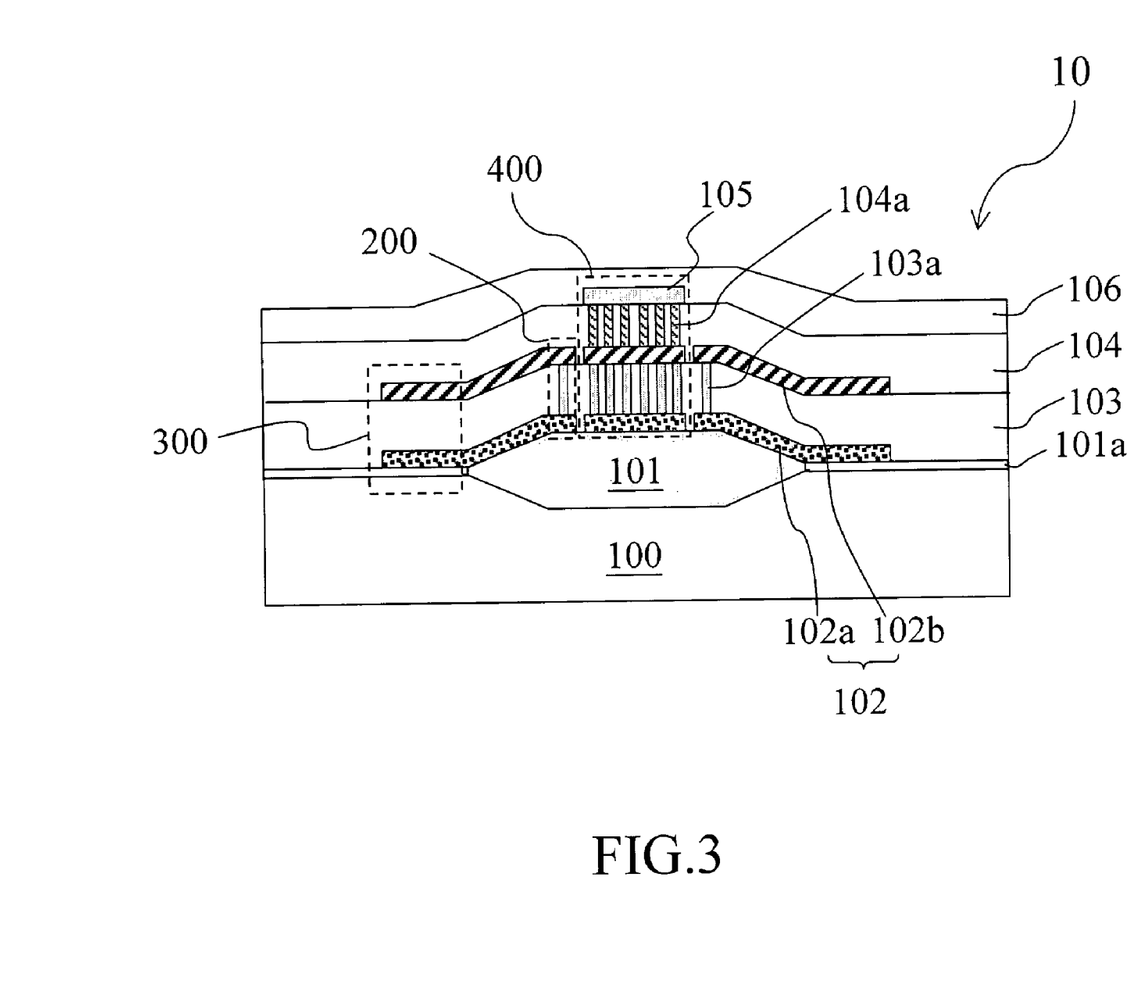
FIG. 3 is a schematic representation of a cross-sectional view of a single thermoelectric sensor, according to an embodiment of the present invention.

In order to illustrate the detailed structure of the sensor 10 in FIG. 2, refer to FIG. 3, which is a schematic representation of a cross-sectional view of a single thermoelectric sensor 10 according to an embodiment of the present invention. The sensor 10 is formed using commercially available CMOS processing with a single polysilicon layer and two metal layers (1P2M). Since CMOS processing is a well-developed skill and technology, the detailed process flow is not redundantly describe herein and the structure design and the material characteristic of the sensor 10 will be illustrated in the following.

First, a heat isolation structure 101 is defined on the silicon substrate 100, wherein the heat isolation structure 101 is defined by utilizing the field oxide layer that is formed using Local Oxidation of Silicon (LOCOS) processing. The portion surrounding the heat isolation structure 101 is defined as the thin oxide layer 101a, which is the gate oxide layer. The thermocouple 102 is composed of a first thermocouple material 102a and a second thermocouple material 102b, wherein the first thermocouple material 102a comprises polysilicon material and the second thermocouple material is the first metal interconnection (Metal #1), which is, for example, of aluminum or aluminum alloy. The first thermocouple material 102a and the second thermocouple material 102b are connected by the via hole metal 103a, which is, for example, tungsten (W). The sensor 10 also comprises an inter-layer dielectric (ILD) 103, an inter-metal dielectric (IMD) 104, and a passivation layer 106.

Furthermore, in order to obtain the biggest temperature gradient (temperature difference) between the hot-junction region 200 and the cold junction region 300 of the thermocouple 102, a heat pipe 400 is arranged to enhance this effect. The heat pipe structure 400 comprises of at least an interconnection layer and a via hole metal. In this embodiment of invention, the heat pipe structure 400 comprises a portion of the polysilicon layer 102a, at least one contact hole metal 103a, at least one via hole metal 104a, a portion of the first metal layer 102b, and a portion of the second metal layer 105, as clearly shown in FIG. 3.

Figure 4:
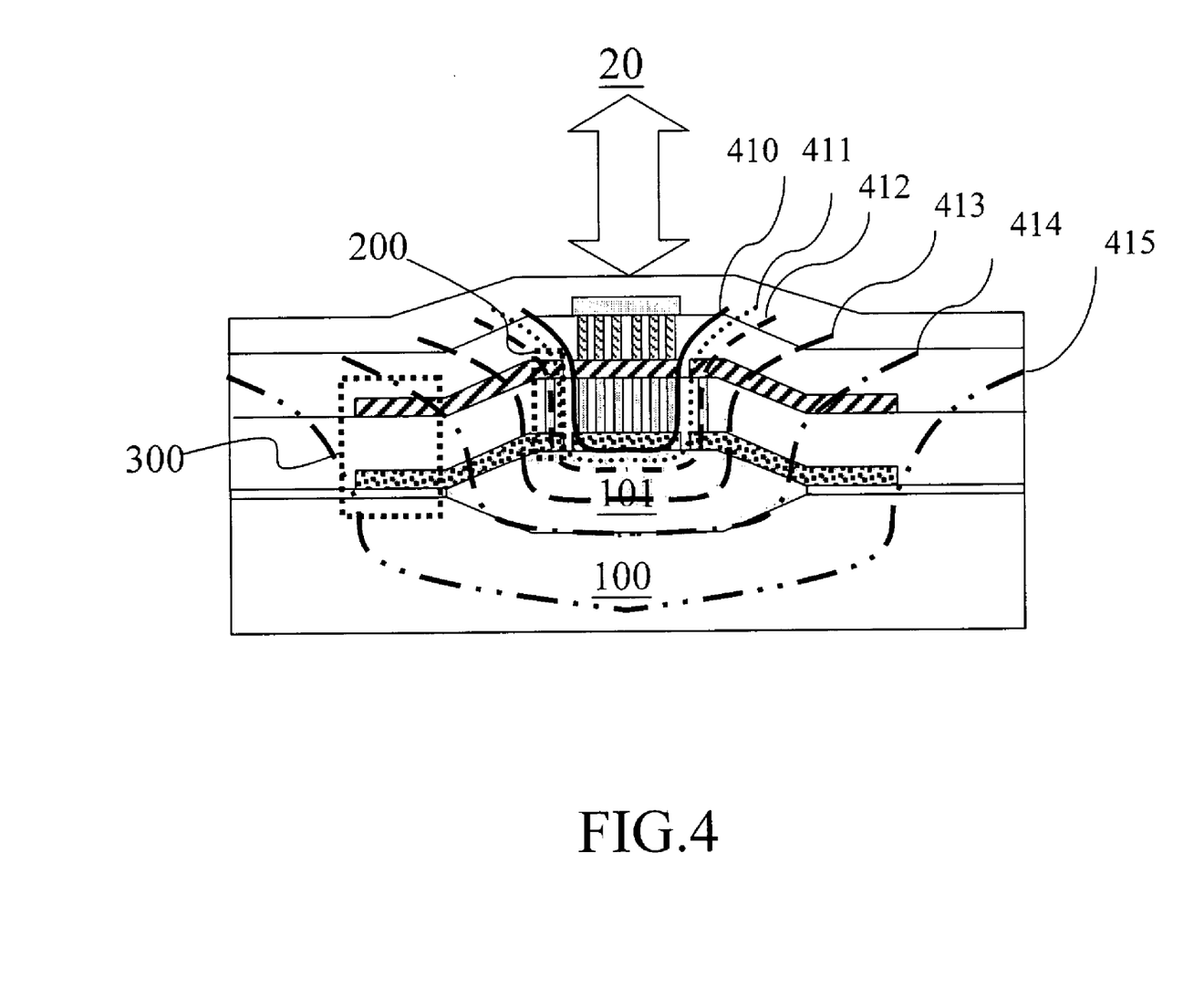
FIG. 4 is a drawing illustrating various temperature contours resulting from the contacting of a finger ridge with the thermoelectric sensor according to an embodiment of the present invention.

Refer to FIG. 4, which is a drawing illustrating a temperature gradient analysis of a single sensor 10 contacted with the finger ridge in accordance with FIG. 3. Each of the curve 410, 411, 412, 413, 414, 415 represents an isothermal curve. Hence, it can be found that the hot-junction region 200 and the cold-junction region 300 are located at different temperature regions and causes a temperature difference $\Delta T$. The analysis result of the temperature difference $\Delta T$ is such as shown in FIG. 5A and the FIG. 5B.

Figure 5A:
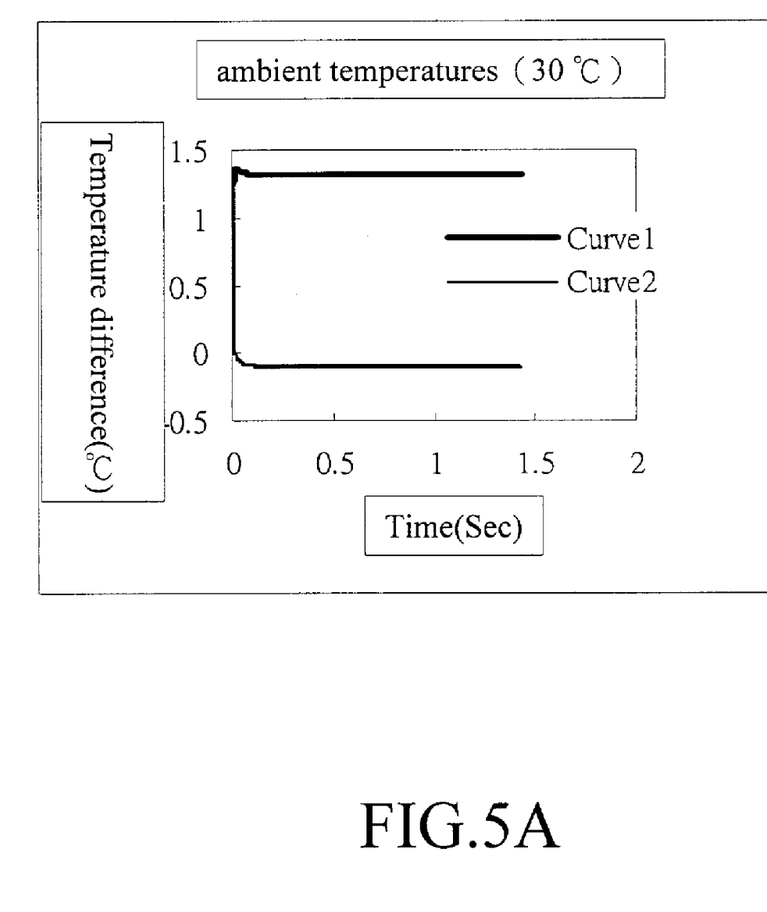
FIG. 5A and FIG. 5B are drawings illustrating response representations with the temperature difference and the time at different surrounding temperatures (30° C. and 40° C.), according to an embodiment of the present invention.
Figure 5B:
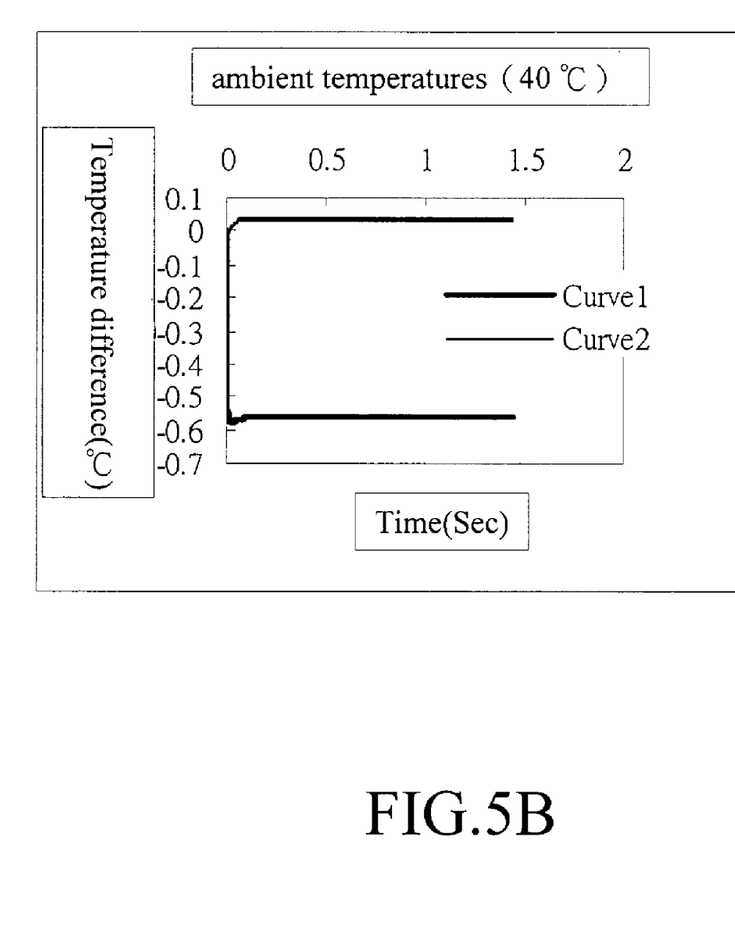

Refer to FIG. 5A and FIG. 5B, which represent the temperature difference $\Delta T$ between the hot- and cold-junctions when in contact with the finger ridge or not at different ambient temperatures (30° C. and 40° C.), respectively. Curve 1 represents the data when the sensor contacts the finger ridge and curve 2 shows the result when the sensor is under the finger valley (non-contact). The analysis result shows that the temperature difference $\Delta T$ of curve 2 almost remains at zero ignoring the ambient temperature variations. But, curve 1 has a quite large temperature difference $\Delta T$ implying a large signal generated when a sensor is contacted by the finger ridge. Also, this sensing principle can be used for live-body detection.

As an example, the area of a sensor is 80 μm×80 μm with 60 pairs of thermocouples. The Seeback coefficient of a thermocouple is about 100 (μV/° C.)(polysilicon and Al). If the temperature difference is 1° C., the generated voltage can reach as high as 6 mV which can be easily processed using existed IC technology.

Figure 6:
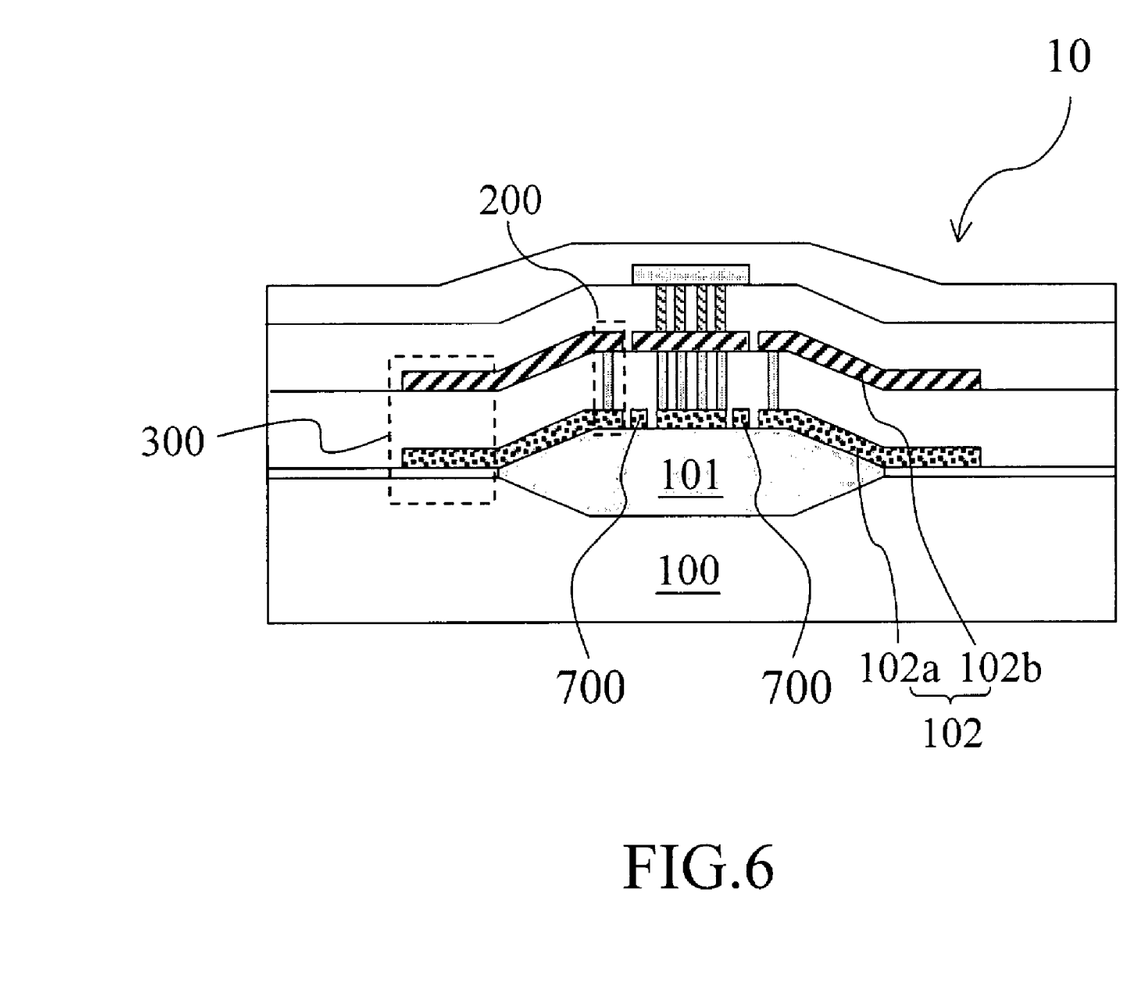
FIG. 6 is a schematic representation of a cross-sectional view of a thermoelectric sensor, according to an embodiment of the present invention.

Refer to FIG. 6, which is a schematic representation illustrating a cross-sectional view of a single thermoelectric sensor, in accordance with another embodiment of the present invention. The difference between FIG. 6 and FIG. 3 is a polysilicon heating resistor 700 formed on the heat isolation structure 101. The resistor is utilized to heat the hot-junction region 200 of the thermocouple 102 in order to keep its temperature constant and above the finger temperature, so the temperature difference $\Delta T$ between the ridge 20 and the sensor device 10 is smaller and the temperature difference $\Delta T$ between the valley 21 and the sensor device 10 is higher. An objective of the present invention is to obtain a stable signal output.

Figure 7:
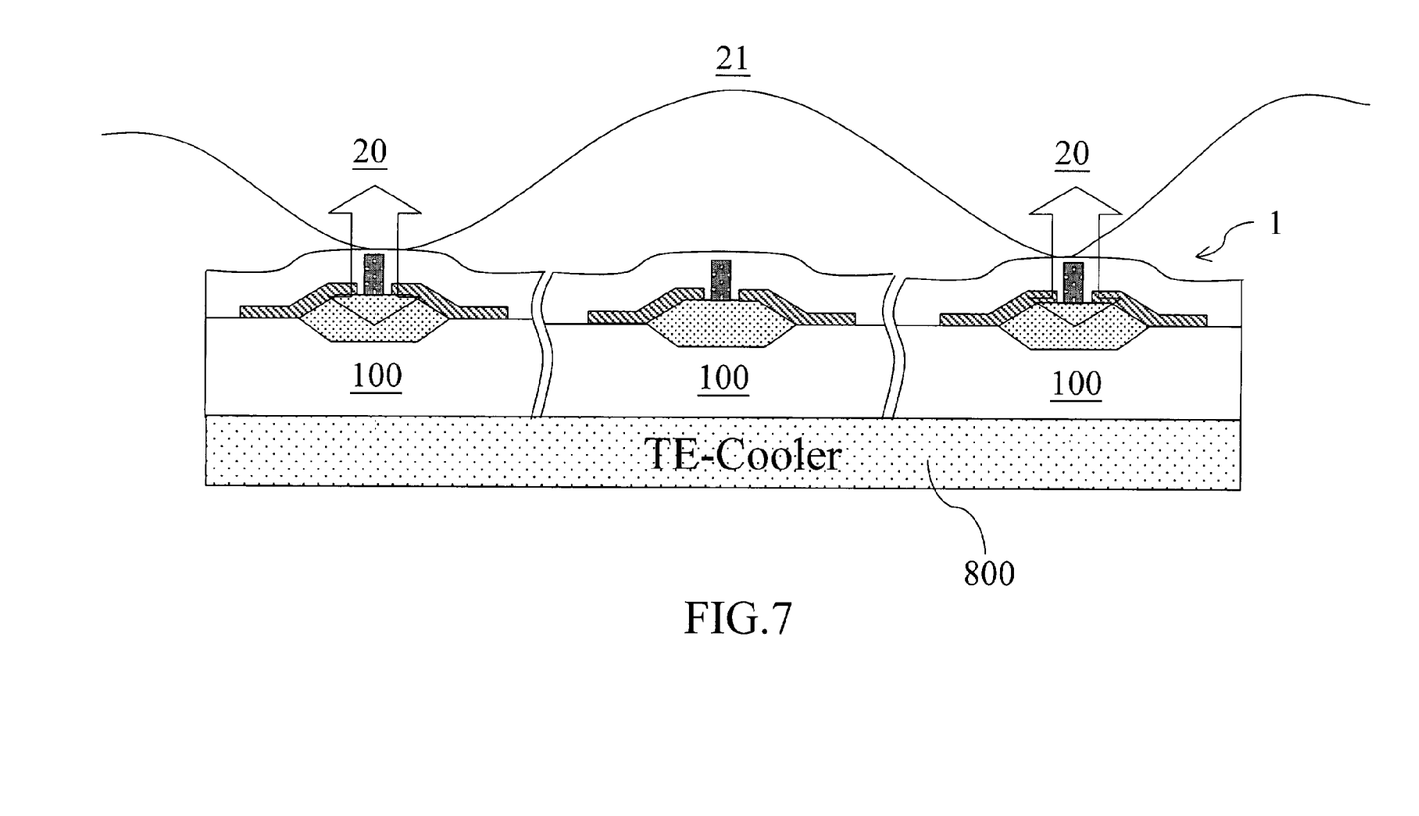
FIG. 7 is a drawing illustrating stabilizing the chip temperature of the fingerprint sensor, according to an embodiment of the present invention.

Refer to FIG. 7, which is another embodiment for stabilizing the chip temperature, in accordance with the present invention. The difference between FIG. 7 and FIG. 2 is a thermoelectric cooler 800 (TE-Cooler) to stabilize the ambient temperature of the fingerprint sensor being higher or lower than the temperature of finger, also, to obtain a stable signal output.

Of course, it is to be understood that the invention described herein need not be limited to these disclosed embodiments. Various modification and similar changes are still possible within the spirit of this invention. In this way, all such variations and modifications are included within the intended scope of the invention and the scope of this invention should be defined by the appended claims. For example, the integrated circuit manufacturing process used for the present invention is, especially, a CMOS process. The basic requirement is to provide at least a polysilicon layer, at least two metal layers and with LOCOS or trench isolation.

What is claimed is:

1. A fingerprint sensor comprising:
   a plurality of thermoelectric sensors arranged in a two-dimensional array including a plurality of signal processing circuits on a single chip, said chip having a hot-junction region and a cold-junction region wherein said cold-junction region surrounds said hot-junction region, whereby a ridge of a fingerprint produces a temperature gradient between said hot-junction region and said cold-junction region when said ridge of said fingerprint closes or contacts said thermoelectric sensor, said thermoelectric sensor further converting said temperature gradient into an electrical voltage signal;

a silicon substrate;

a field oxide layer or a trench isolation layer on said silicon substrate acting as a thermal-isolation structure;

at least a thermocouple connected in series to form a thermopile, wherein said hot-junction region of said thermopile is located at a central portion of said field oxide layer and said cold-junction region is located on a thin oxide layer which is surrounding said field oxide layer; and a heat pipe structure comprising at least an interconnection layer and at least a via hole metal, wherein said heat pipe structure is located between said central portion of said field oxide layer and a passivation layer which is on a surface of said substrate.

2. The fingerprint sensor chip according to claim 1, further comprising a thermo-electrical cooler arranged under said fingerprint sensor chip to stabilize ambient temperature of said thermoelectric sensor being higher or lower than a temperature of a finger.

3. The fingerprint sensor chip according to claim 1, wherein said thermocouple includes a first thermocouple material and a second thermocouple material, and wherein said first thermocouple material and said second thermocouple material are respectively made of by selected from the combination of a N type silicon conductor and a P type silicon conductor, and a combination of a silicon conductor and a metal conductor.

4. The fingerprint sensor chip according to claim 1, further comprising a heating resistor arranged over said thermal-isolation structure to heat said hot-junction region of said thermocouple to keep a temperature of said hot-junction region constant and higher than said temperature of said finger.

5. The fingerprint sensor chip according to claim 4, wherein said heating resistor is a silicon conductor.

6. A CMOS thermoelectric sensor comprising at least a polysilicon layer and at least two interconnection layers, said thermoelectric sensor comprising following elements:

a silicon substrate;

a thermo-isolation structure defined on said silicon substrate, wherein said thermo-isolation structure is defined by utilizing a field oxide layer or a trench isolation layer;

a thin oxide layer formed surrounding said thermo-isolation structure, wherein said thin oxide layer is used as a gate oxide layer;

at least a thermocouple composing of a first thermocouple material and a second thermocouple material, wherein a hot-junction region of said thermopile is located at a central portion of said field oxide layer and a cold-junction region is located on a thin oxide layer which is surrounding said field oxide layer;

at least a via hole metal to connect said first thermocouple material and said second thermocouple material; and a heat pipe structure comprising at least an interconnection layer and at least a via hole metal plug, wherein said heat pipe structure is located between said central portion of said field oxide layer and a passivation layer which is on a surface of said substrate.

7. The thermoelectric sensor according to claim 6, wherein said first thermocouple material comprises polysilicon material and said second thermocouple material is an interconnection layer.

8. The thermoelectric sensor according to claim 6, wherein said via hole metal comprises tungsten.

* * * * *